(12) United States Patent
Eastlake, III

(10) Patent No.: US 8,351,352 B1
(45) Date of Patent: Jan. 8, 2013

(54) METHODS AND APPARATUS FOR RBRIDGE HOP-BY-HOP COMPRESSION AND FRAME AGGREGATION

(76) Inventor: Donald E. Eastlake, III, Milford, MA (US)

( * ) Notice: Subject to any disclaimer, the term of this patent is extended or adjusted under 35 U.S.C. 154(b) by 201 days.

(21) Appl. No.: 12/836,295

(22) Filed: Jul. 14, 2010

Related U.S. Application Data

(60) Provisional application No. 61/225,686, filed on Jul. 15, 2009.

(51) Int. Cl.
*H04L 12/28* (2006.01)
(52) U.S. Cl. .......................... 370/256; 370/401; 709/239
(58) Field of Classification Search .................. 370/238, 370/255, 256, 401; 709/239
See application file for complete search history.

(56) References Cited

U.S. PATENT DOCUMENTS

| | | | | |
|---|---|---|---|---|
| 7,398,322 | B1 * | 7/2008 | Perlman | ........................ 709/239 |
| 2002/0159398 | A1 * | 10/2002 | Yamada et al. | ............... 370/256 |
| 2009/0046719 | A1 * | 2/2009 | Ashwood Smith | ........... 370/392 |
| 2010/0226381 | A1 * | 9/2010 | Mehta et al. | .................. 370/401 |
| 2010/0246388 | A1 * | 9/2010 | Gupta et al. | .................. 370/225 |

OTHER PUBLICATIONS

Eastlake, Donald E. "RBridge Traffic Aggregation and Compression" Motorola, Inc. Broadband Network Research Laboratory, Motorola Laboratories, 2008.

* cited by examiner

*Primary Examiner* — Jung Park
(74) *Attorney, Agent, or Firm* — Wolf, Greenfield & Sacks, P.C.

(57) ABSTRACT

Some embodiments relate to a network comprising two RBridges connected by a link where the two RBridges are not the ingress and egress RBridge for said frames, wherein said RBridges automatically exchange information as to their support of hop-by-hop reversible frame aggregation, reversible header compression, and reversible data compression, and wherein if both RBridges support any or all of these features in the same fashion, one or more of said features are automatically applied to appropriate frames at the transmitting RBridge and removed at the receiving RBridge, increasing the throughput of the link.

9 Claims, 7 Drawing Sheets

METHODS AND APPARATUS FOR RBRIDGE HOP-BY-HOP COMPRESSION AND FRAME AGGREGATION

CROSS-REFERENCE TO RELATED APPLICATIONS

This application claims a priority benefit, under 35 U.S.C. §119(e), of U.S. Provisional Patent Application No. 61/225,686, entitled "RBridge Hop-By-Hop Compression And Frame Aggregation," filed on Jul. 15, 2009.

BACKGROUND

1. Field of Invention

The techniques described herein are directed generally to the field of network communications between RBridges.

2. Description of the Related Art

Computer network bridging has great advantages. It provides a plug-and-play environment that is substantially transparent to the network data frames being sent through it. For many applications, no manual configuration of the bridges is needed. Thus in FIG. 1, end stations, such as user client or server computers or Internet Protocol routers can be attached or detached to or from various bridges or multi-access links (such as the multi-access link between Bridge 1 and Bridge 2) and, when attached, will be able to communicate with each other by Ethernet protocols.

Besides Ethernet (IEEE 802.3) links, other types of links can be accommodated by some bridges, such as Wi-Fi (IEEE 802.11), SONET, WiMax (IEEE 802.16), Token Ring, and even virtual links such as IETF PPP (Point-to-Point Protocol). The IEEE (Institute for Electrical and Electronics Engineers) 802.1 Working Group has been the home for bridging standardization.

Thus far bridging standards have been based on the Spanning Tree Protocol (STP). Despite improvements over the years, such as RSTP (Rapid Spanning Tree Protocol) and MSTP (Multiple Spanning Tree Protocol), bridging has continued to be fundamentally based on the insights STP, which are now a quarter of a century old.

Without spanning tree, traffic introduced into the network shown in FIG. 2 would cycle endlessly around the rings formed by Bridges 1, 2, and 5 and by Bridges 2, 3, and 4. STP operates by turning off ports to reduce network connectivity to a loop-free tree structure as shown in FIG. 3 where the port at the Bridge 1 end of the Bridge 1-2 link has been disabled and the Bridge 3 end of the Bridge 3-4 link has been disabled. (MSTP allows several different superimposed trees but this restriction applies to each of them.)

This disabling of ports has the disadvantage of wasting resources. Spanning tree reduces throughput by congesting traffic onto the links that remain connected as part of the tree selected by STP. Further, spanning tree increases the latency (time delay) through the network for most traffic because that traffic does not take the fastest or most direct route through the network but is forced to follow a path within the STP selected tree that typically involves more hops. In FIG. 3, traffic from an end station attached to Bridge 1 to an end station attached to any of Bridges 2 through 4 is forced, by spanning tree, to take an extra hop through Bridge 5.

Other disadvantages of the varieties of STP include slow convergence when there are changes in network components such as the addition, repair, removal or failure of bridges and/or links. The original STP standard defaulted to delays of 30 seconds while even Rapid Spanning Tree Protocol can block traffic for 4 seconds for certain network failures. Such delays can be damaging for applications that require rapid failover, such as real time voice transmission or process control.

VLANs (Virtual Local Area Networks) provide a means of separating Layer 2 end stations into communities such that a bridged network that receives a frame in a particular VLAN will only deliver it to other stations in that same VLAN. The way that STP bridges handle VLANs means that a change in network connectivity leading to a change in the spanning tree can partition VLANs, leaving different stations in the same VLAN disconnected, if bridge ports are not carefully configured.

For further information on some of the above points, see IETF RFC 5556, "Transparent Interconnection of Lots of Links (TRILL): Problem and Applicability Statement," which is hereby incorporated by reference in its entirety.

RBridges, or Routing Bridges, solve many of the problems of spanning tree protocols by adopting a completely different method. They use link state routing techniques to route on MAC addresses and encapsulate frames with a header including a hop count limit. This idea was presented at and published in the proceedings of the Infocom 2004 meeting under the title "RBridges: Transparent Routing" by Radia Perlman and is described in U.S. Pat. No. 7,398,222, which is hereby incorporated by reference in its entirety.

The Internet Engineering Task Force (IETF) has standardized an RBridge protocol called TRILL (Transparent Interconnection of Lots of Links) based on the IS-IS (Intermediate System to Intermediate System) link state routing protocol. IS-IS has been standardized by ISO (the International Standards Organization) in ISO/IEC 10589:2002, "Intermediate system to Intermediate system routeing information exchange protocol for use in conjunction with the Protocol for providing the Connectionless-mode Network Service (ISO 8473)," which is hereby incorporated by reference in its entirety.

Devices that implement the TRILL protocol are called RBridges. We will use the term RBridge below for both the devices and IETF protocol. Just as an area of interconnected physical links and bridges, including at least one bridge, and bounded by end stations, is called a "bridged LAN" (Local Area Network), so an area of links, bridges, and RBridges is called an "RBridge campus". To bridges, an RBridge appears to be an end station while to end stations, RBridges are as transparent as bridges are.

RBridges do not disable ports to limit traffic to a spanning tree. They provide optimal point-to-point routing of unicast frames through the local area network without configuration. They support multi-pathing of both unicast and multi-destination data that can further increase potential throughput by spreading traffic over alternative paths. They can be incrementally deployed into a bridged LAN by replacing spanning tree bridges with RBridges. Bridged LANs between RBridges appear to those RBridges to be multi-access links. RBridges also provide connectivity between all end stations in each VLAN provided those end stations have connectivity to an RBridge.

When an end station (native) frame, such as that shown in FIG. 4, encounters its first RBridge (the "ingress" RBridge), it is encapsulated with an RBridge header, as shown in FIG. 5, that includes a maximum hop count and has provisions for options. If the frame is to a known unicast address, it is forwarded RBridge hop by RBridge hop to the "egress" RBridge which decapsulates the original native frame and sends it on the link to its end station destination. If the frame is to multiple destinations, it is distributed on a tree and usually decapsulated by multiple egress RBridges that send it on multiple links. RBridges differ from routers in that when a frame is transmitted from a first end station to a second end state, the frame that the first end station transmits is identical to the frame that is ultimately received by the second end station. That is, while RBridges may add headers to transmitted frames, these headers are stripped before the frames are delivered to their end station destinations, such that RBridges do not modify the content that is delivered to the end station. By contrast, routers modify frame data, such that the frame received by an end station is not necessarily identical to the originally transmitted frame.

The RBridge protocol also dynamically allocates 16-bit nicknames for the RBridges in a campus. These nicknames are abbreviations for the RBridge's 48-bit IS-IS System ID. The RBridge Header of an encapsulated frame includes the nickname of the ingress RBridge for that frame and a bit indicating if the frame is single destination (known unicast) or multi-destination (broadcast, multicast, or unknown unicast). There is also an egress nickname field that holds the nickname of the egress RBridge for single destination frames and the root of the distribution tree for multi-destination frames.

Advantages of encapsulation include loop mitigation through use of a hop count field, elimination of the need for original source and destination MAC address learning in transit RBridges, direction of frames towards the egress RBridge (this enables forwarding tables of RBridges to be sized with the number of RBridges rather than the total number of end nodes), and provision of a separate VLAN tag for forwarding traffic between RBridges, independent of the VLAN of the native frame.

Only ingress and egress RBridges need to learn a number of end station MAC addresses proportional to the number of end stations whose traffic they handle. Transit RBridges need only learn addresses proportional to the number of RBridges, which is normally much smaller than the number of end stations. This contrasts with classic IEEE 802.1 bridged networks where all bridges along a path must learn the end station MAC addresses for traffic along that path.

SUMMARY

One embodiment is directed to a method for transmitting information in a network comprising a plurality of RBridges, the plurality of RBridges including a first RBridge and a second RBridge, the method comprising: sending, from the first RBridge to the second RBridge, first capability information indicative of whether the first RBridge supports any of hop-by-hop reversible frame aggregation, reversible header compression, or reversible data compression; receiving, at the first RBridge, second capability information from the second RBridge, indicative of whether the second RBridge supports any of hop-by-hop reversible frame aggregation, reversible header compression, or reversible data compression; determining, at the first RBridge, based at least in part on the received second capability information, whether any of hop-by-hop reversible frame aggregation, reversible header compression, or reversible data compression are supported by both the first RBridge and the second RBridge; when it is determined that at least one capability in the group of capabilities comprising hop-by-hop reversible frame aggregation, reversible header compression, or reversible data compression is supported by both the first RBridge and the second RBridge, automatically applying the at least one capability to at least one data frame transmitted from the first RBridge to the second RBridge, wherein the first RBridge is not an ingress RBridge for the at least one data frame or wherein the second RBridge is not an egress RBridge for the at least one data frame.

Another embodiment is directed to at least one computer-readable medium, encoded with instructions that, when executed by a hardware processor, perform a method for transmitting information in a network comprising a plurality of RBridges, the plurality of RBridges including a first RBridge and a second RBridge, the method comprising: sending, from the first RBridge to the second RBridge, first capability information indicative of whether the first RBridge supports any of hop-by-hop reversible frame aggregation, reversible header compression, or reversible data compression; receiving, at the first RBridge, second capability information from the second RBridge, indicative of whether the second RBridge supports any of hop-by-hop reversible frame aggregation, reversible header compression, or reversible data compression; determining, at the first RBridge, based at least in part on the received second capability information, whether any of hop-by-hop reversible frame aggregation, reversible header compression, or reversible data compression are supported by both the first RBridge and the second RBridge; when it is determined that at least one capability in the group of capabilities comprising hop-by-hop reversible frame aggregation, reversible header compression, or reversible data compression is supported by both the first RBridge and the second RBridge, automatically applying the at least one capability to at least one data frame transmitted from the first RBridge to the second RBridge, wherein the first RBridge is not an ingress RBridge for the at least one data frame or wherein the second RBridge is not an egress RBridge for the at least one data frame.

A further embodiment is directed to a first RBridge in a network comprising a plurality of RBridges, the first RBridge comprising: at least one computer-readable hardware memory; and at least one hardware processor, coupled to the at least one computer-readable memory configured to: send, to a second RBridge in the plurality of RBridges, first capability information indicative of whether the first RBridge supports any of hop-by-hop reversible frame aggregation, reversible header compression, or reversible data compression; receive second capability information from the second RBridge, the second capability information being indicative of whether the second RBridge supports any of hop-by-hop reversible frame aggregation, reversible header compression, or reversible data compression; determine, based at least in part on the received second capability information, whether any of hop-by-hop reversible frame aggregation, reversible header compression, or reversible data compression are supported by both the first RBridge and the second RBridge; when it is determined that at least one capability in the group of capabilities comprising hop-by-hop reversible frame aggregation, reversible header compression, or reversible data compression is supported by both the first RBridge and the second RBridge, automatically apply the at least one capability to at least one data frame transmitted from the first RBridge to the second RBridge, wherein the first RBridge is not an ingress RBridge for the at least one data frame or wherein the second RBridge is not an egress RBridge for the at least one data frame.

DETAILED DESCRIPTION

Network bandwidth is always at a premium so techniques that will make the best use of available bandwidth are valuable. There are two effects that result in wasted bandwidth: (1) Some messages sent within local networks are internally redundant, with low data density, wasting bandwidth. One example is a message whose data includes large blocks of zeros or other constant or repeating data; and (2) There is a certain amount of overhead per frame on Ethernet links and some other types of links. This overhead does not convey any useful data. It is needed to separate and identify frames, synchronize the transmission, and the like. As the average frame size gets smaller this overhead generally occupies an increasing fraction of the bandwidth on a link, since the overhead is typically a constant amount per frame. In particular, for Ethernet there is normally a seven byte preamble followed by a one byte start frame delimiter, followed by the destination and source media access addresses (6 bytes each), then the actual useful data, and ending with a two byte frame check sequence and an inter-frame gap during which nothing is transmitted, typically for longer than it would take to send 9 bytes of data. Thus the minimum overhead per frame is the equivalent of 31 bytes of data.

For many local network communications applications, effective throughput can be increased with frame aggregation and lossless data compression techniques as well as with header compression. Frame aggregation combines multiple short frames, saving all but one occurrence of the per frame overhead at the expense of a small amount of added information to permit the aggregated frames to be split apart.

The inventor has appreciated that there are advantages to being able to compress data and aggregate frames on a hop-by-hop basis using the RBridge options feature. For example, it may be that compression or aggregation at line speed requires hardware assist and that two adjacent transit RBridges have such hardware while the ingress and/or egress RBridges handling a frame do not.

Figure 1:
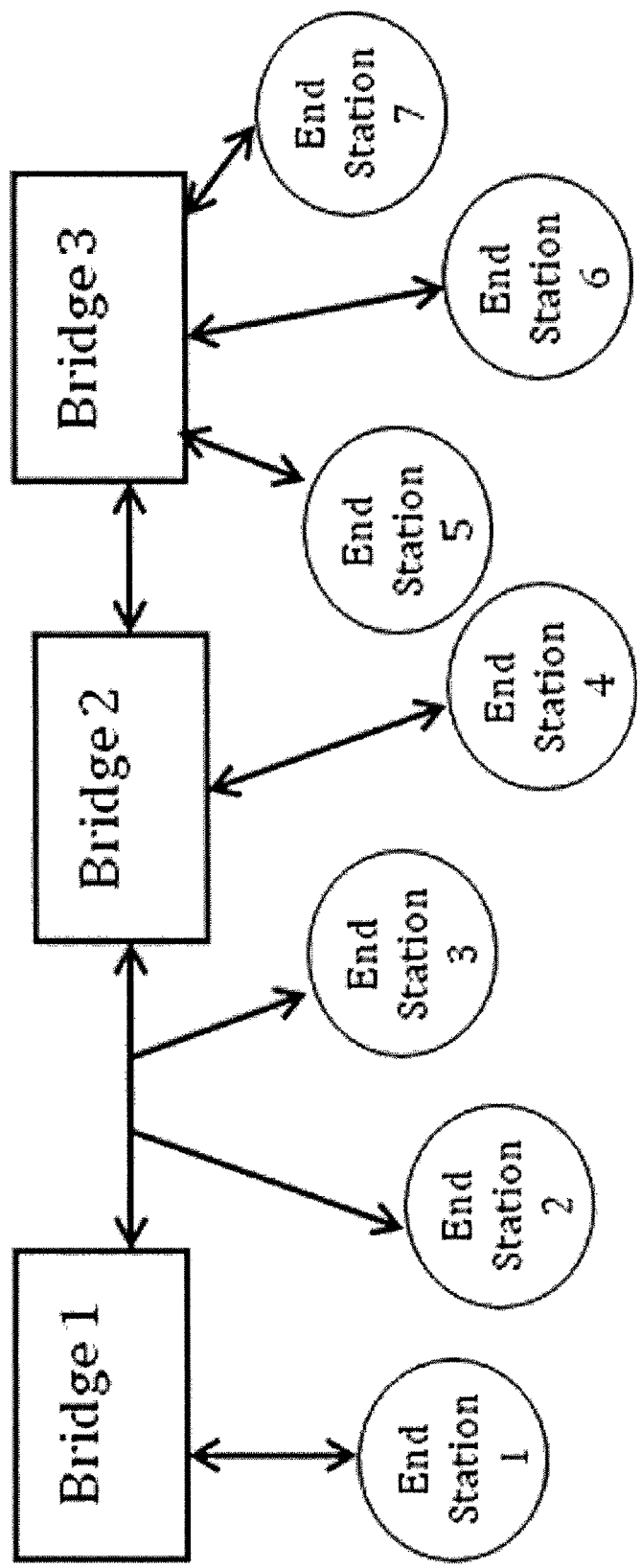
FIG. 1 is a block diagram of a network of end stations connected via bridges in a first configuration.
Figure 2:
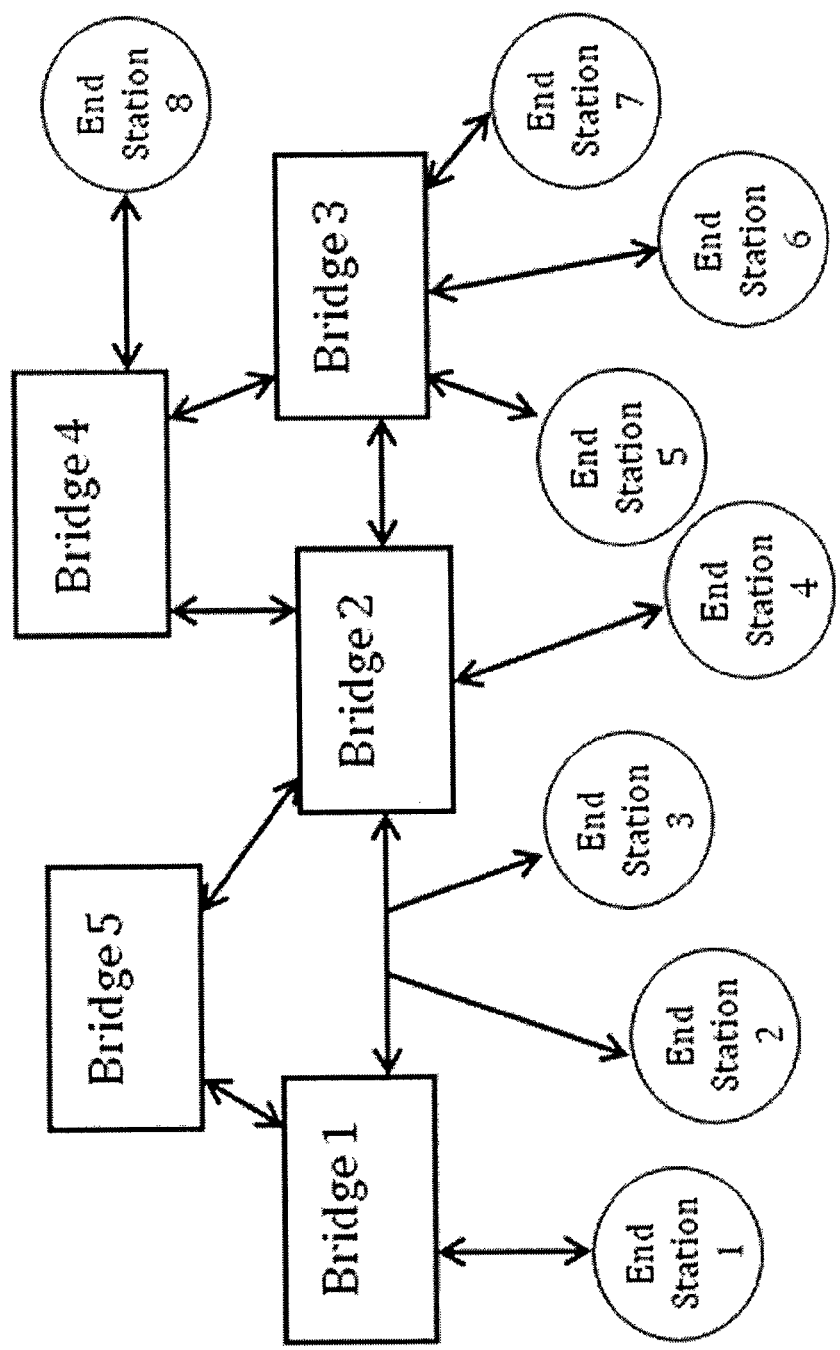
FIG. 2 is a block diagram of a network of end stations connected via bridges in a second configuration.
Figure 3:
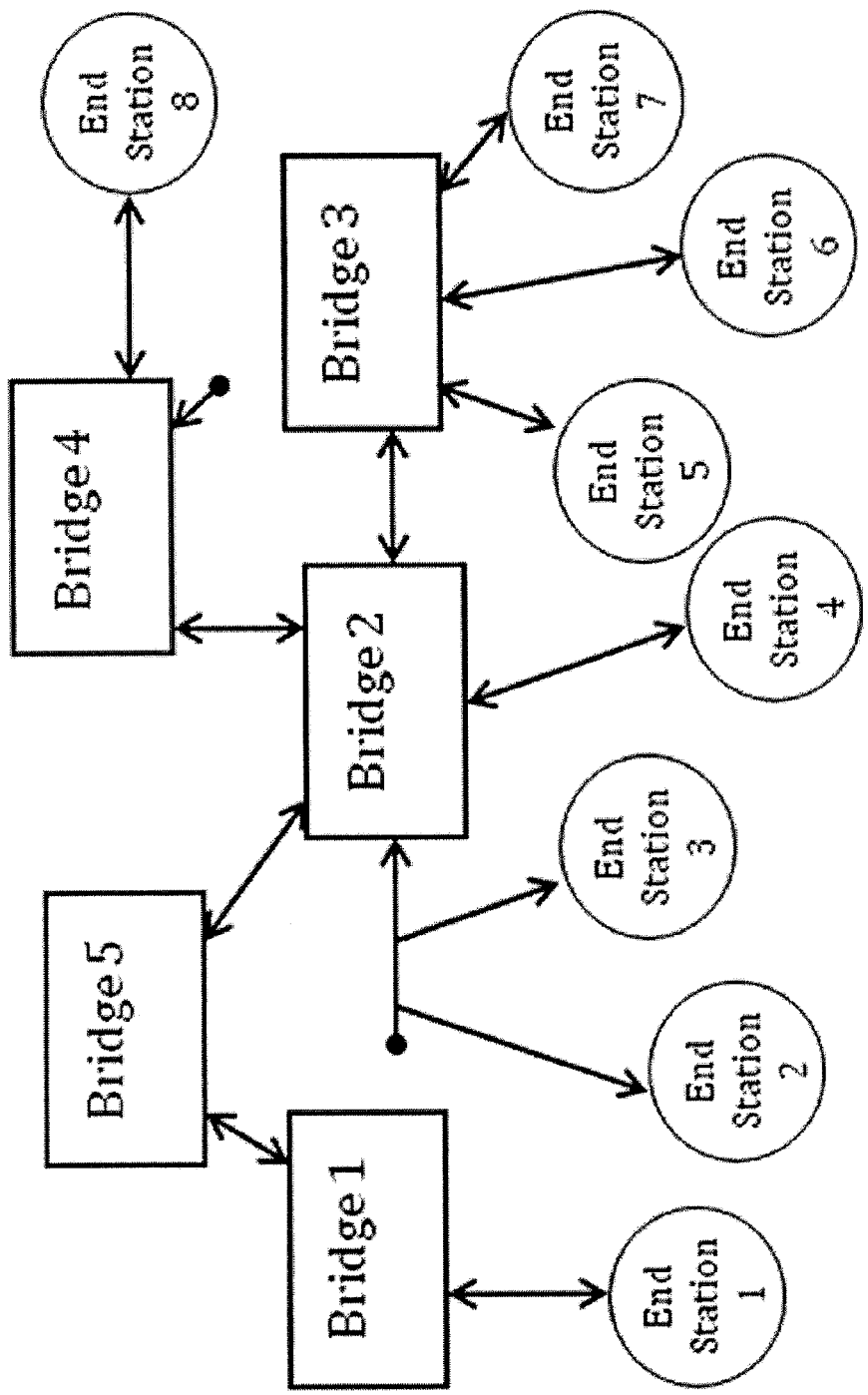
FIG. 3 is a block diagram of a network of end stations connected via bridges in a third configuration.
Figure 4:
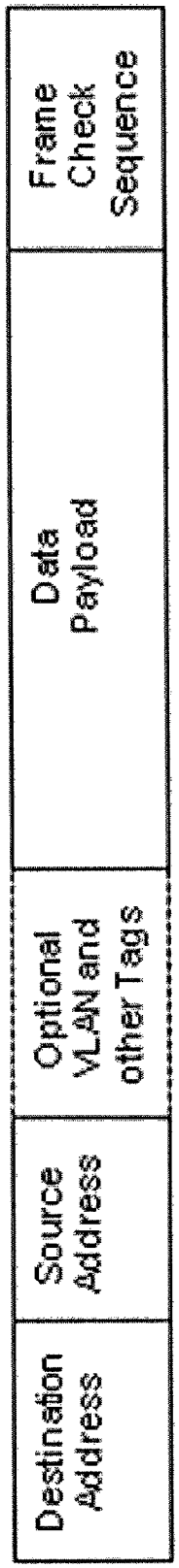
FIG. 4 is a diagram illustrating the format of an Ethernet frame.
Figure 5:
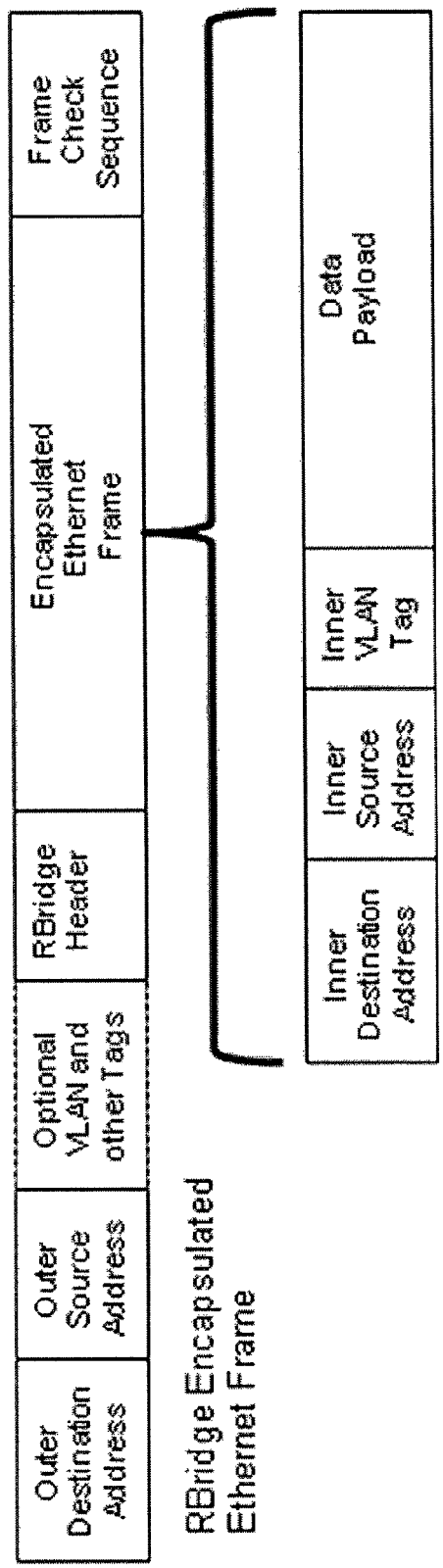
FIG. 5 is a diagram illustrating an RBridge encapsulated Ethernet frame.
Figure 6:
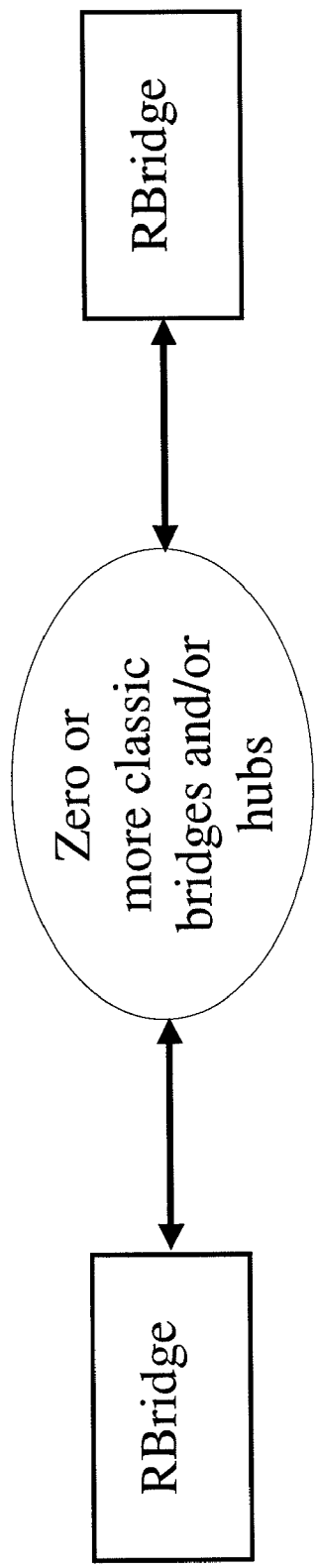
FIG. 6 is a block diagram showing one-hop separated RBridges.

One-hop separated RBridges are shown in FIG. 6. While it is usually not useful to apply compression to already compressed data, existing aggregated frames can be further aggregated if they will still fit within the maximum transmission unit size of the link.

Adjacent RBridges may inform each other that they support hop-by-hop compression and/or frame aggregation and may inform each other of the particular algorithms supported in the same way other hop-by-hop option information is conveyed: through information included in the Hello messages they exchange. When they have confirmed that they both support the same options and compatible algorithms, then, depending on local policy and the particular frame involved, the options and algorithms may be applied to encapsulated data frames being sent between them. The application of the option to a frame would be indicated in the options section of the RBridge encapsulation header of that frame. Compression may start after the RBridge header so that the receiver can understand the indication that the remainder of the frame is compressed. One example of a type of compression that may be used is lossless data compression using an algorithm adapted to high data rates, such as move-to-front coding based compression. Move-to-front encoding is described in greater detail in U.S. Pat. No. 5,384,568, which is incorporated by reference herein in its entirety.

It may not be possible for any particular compression algorithm to compress all possible frames. Thus, in some embodiments, compression may only be used for those frames where it results in savings and where those savings exceed the small additional space taken up by the header option indication that the frame is compressed. In other cases the frame may be sent uncompressed.

Frames that are aggregated may be those with the same handling priority, to avoid giving low priority frames any undue handle from their being aggregated with a high priority frame. The aggregation of multiple short frames can increase the logical frame arrival rate at the receiver beyond it capabilities; as a result, it is generally safer to only aggregate mixtures of short and longer frames such that the average data length of the aggregated frames is not significantly shorter than a minimum size frame plus the per frame overhead for the link.

If both lossless data compression and aggregation are being done, it is generally better to aggregate first because longer sets of data are normally more compressible.

Figure 7:
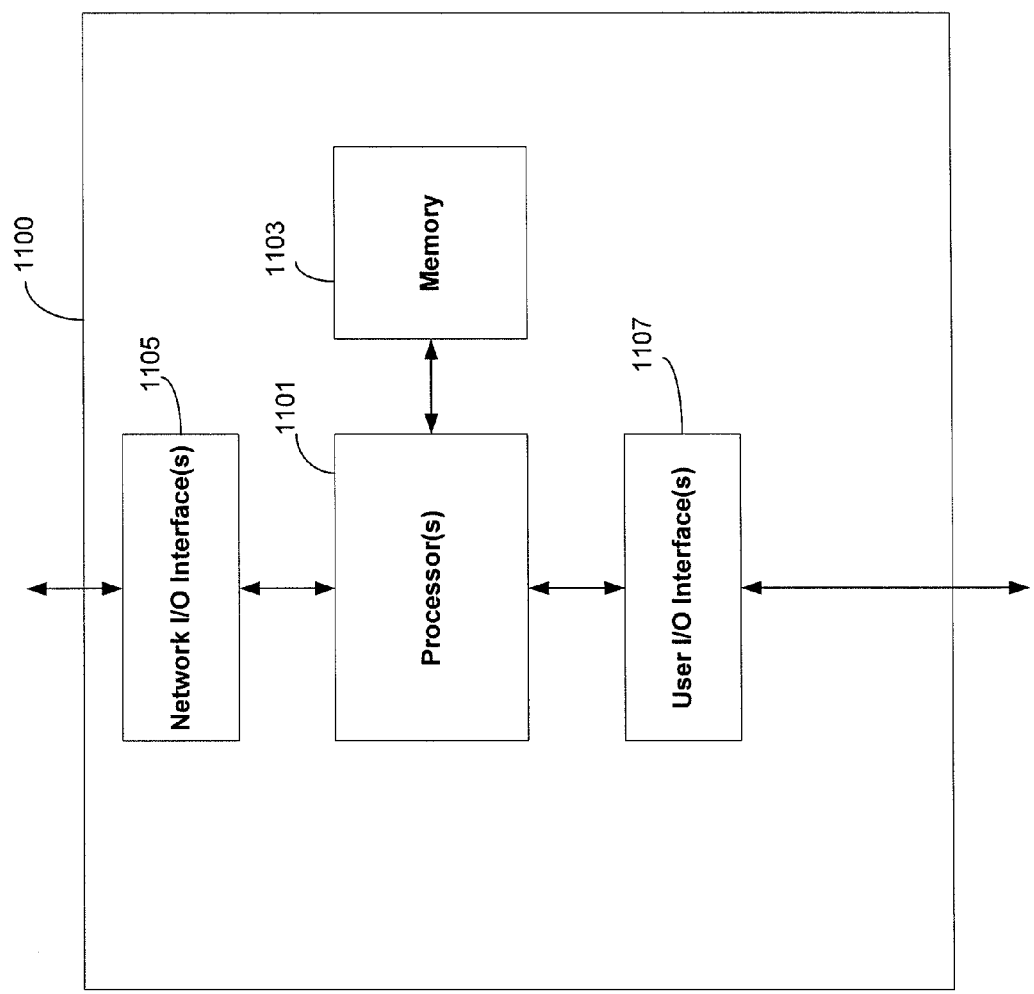
FIG. 7 is a block diagram of a computing device on which some embodiments may be implemented.

FIG. 7 is a block diagram an illustrative computing device 1100 that may be used to implement any of the above-discussed computing devices. Computing device 1100 may be a client computer, an RBridge, or any other suitable type of computing device.

The computing device 1100 may include one or more processors 1101 and one or more tangible, non-transitory computer-readable storage media (e.g., memory 1103). Memory 1103 may store, in tangible non-transitory computer-readable storage media computer instructions that implement any of the above-described functionality. Processor(s) 1101 may be coupled to memory 1103 and may execute such computer instructions to cause the functionality to be realized and performed. Computing device 1100 may also include a network input/output (I/O) interface 1105 via which the computing device may communicate with other computers (e.g., over a network), and, in some embodiments. may also include one or more user I/O interfaces, via which the computer may provide output to and receive input from a user. The user I/O interfaces may include devices such as a keyboard, a mouse, a microphone, a display device (e.g., a monitor or touch screen), speakers, a camera, and/or various other types of I/O devices.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. It should be appreciated that any component or collection of components that perform the functions described above can be generically considered as one or more controllers that control the above-discussed functions. The one or more controllers can be implemented in numerous ways, such as with dedicated hardware, or with general purpose hardware (e.g., one or more processors) that is programmed using microcode or software to perform the functions recited above.

In this respect, it should be appreciated that one implementation of various embodiments of the present invention comprises at least one tangible, non-transitory computer-readable storage medium (e.g., a computer memory, a floppy disk, a compact disk, and optical disk, a magnetic tape, a flash memory, circuit configurations in Field Programmable Gate Arrays or other semiconductor devices, etc.) encoded with one or more computer programs (i.e., a plurality of instructions) that, when executed on one or more computers or other processors, performs the above-discussed functions of various embodiments of the present invention. The computer-readable storage medium can be transportable such that the program(s) stored thereon can be loaded onto any computer resource to implement various aspects of the present invention discussed herein. In addition, it should be appreciated that the reference to a computer program which, when executed, performs the above-discussed functions, is not limited to an application program running on a host computer. Rather, the term computer program is used herein in a generic sense to reference any type of computer code (e.g., software or microcode) that can be employed to program a processor to implement the above-discussed aspects of the present invention.

Various aspects of the present invention may be used alone, in combination, or in a variety of arrangements not specifically discussed in the embodiments described in the foregoing and are therefore not limited in their application to the details and arrangement of components set forth in the foregoing description or illustrated in the drawings. For example, aspects described in one embodiment may be combined in any manner with aspects described in other embodiments.

Also, embodiments of the invention may be implemented as one or more methods, of which an example has been provided. The acts performed as part of the method(s) may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the invention in detail, various modifications and improvements will readily occur to those skilled in the art. Such modifications and improvements are intended to be within the spirit and scope of the to invention. Accordingly, the foregoing description is by way of example only, and is not intended as limiting. The invention is limited only as defined by the following claims and the equivalents thereto.

What is claimed is:

1. A method for transmitting information in a network comprising a plurality of RBridges, the plurality of RBridges including a first RBridge and a second RBridge, the method comprising:

sending, from the first RBridge to the second RBridge, first capability information indicative of whether the first RBridge supports any of hop-by-hop reversible frame aggregation, reversible header compression, or reversible data compression;

receiving, at the first RBridge, second capability information from the second RBridge, indicative of whether the second RBridge supports any of hop-by-hop reversible frame aggregation, reversible header compression, or reversible data compression;

determining, at the first RBridge, based at least in part on the received second capability information, whether any of hop-by-hop reversible frame aggregation, reversible header compression, or reversible data compression are supported by both the first RBridge and the second RBridge;

when it is determined that at least one capability in the group of capabilities comprising hop-by-hop reversible frame aggregation, reversible header compression, or reversible data compression is supported by both the first RBridge and the second RBridge, automatically applying the at least one capability to at least one data frame transmitted from the first RBridge to the second RBridge, wherein the first RBridge is not an ingress RBridge for the at least one data frame or wherein the second RBridge is not an egress RBridge for the at least one data frame, wherein the at least one capability comprises at least two capabilities, wherein the at least two capabilities include hop-by-hop reversible frame aggregation and reversible data compression, and wherein the act of automatically applying further comprises:

applying hop-by-hop reversible frame aggregation to that at least one data frame before applying reversible data compression to the at least one data frame.

2. The method of claim 1 where the act of sending, from the first RBridge to the second RBridge, first capability information indicative of whether the first RBridge supports any of hop-by-hop reversible frame aggregation, reversible header compression, or reversible data compression further comprises:

sending the first capability information from the first RBridge to the second RBridge in at least one IS-IS message that comprises at least one TRILL Hello or at least one P2P Hello.

3. The method of claim 1, wherein the act of automatically applying the at least one capability to at least one data frame further comprises:

including in TRILL header options in a header of the data frame information indicative of the at least one capability applied to the at last one data frame.

4. At least one non-transitory computer-readable medium, encoded with instructions that, when executed by a hardware processor, perform a method for transmitting information in a network comprising a plurality of RBridges, the plurality of RBridges including a first RBridge and a second RBridge, the method comprising:

sending, from the first RBridge to the second RBridge, first capability information indicative of whether the first RBridge supports any of hop-by-hop reversible frame aggregation, reversible header compression, or reversible data compression;

receiving, at the first RBridge, second capability information from the second RBridge, indicative of whether the second RBridge supports any of hop-by-hop reversible frame aggregation, reversible header compression, or reversible data compression;

determining, at the first RBridge, based at least in part on the received second capability information, whether any of hop-by-hop reversible frame aggregation, reversible header compression, or reversible data compression are supported by both the first RBridge and the second RBridge;

when it is determined that at least one capability in the group of capabilities comprising hop-by-hop reversible frame aggregation, reversible header compression, or reversible data compression is supported by both the first RBridge and the second RBridge, automatically applying the at least one capability to at least one data frame transmitted from the first RBridge to the second RBridge, wherein the first RBridge is not an ingress RBridge for the at least one data frame or wherein the second RBridge is not an egress RBridge for the at least one data frame, wherein the at least one capability comprises at least two capabilities, wherein the at least two capabilities include hop-by-hop reversible frame aggregation and reversible data compression, and wherein the act of automatically applying further comprises:

applying hop-by-hop reversible frame aggregation to that at least one data frame before applying reversible data compression to the at least one data frame.

5. The at least one non-transitory computer-readable medium of claim 4 where the act of sending, from the first RBridge to the second RBridge, first capability information indicative of whether the first RBridge supports any of hop-by-hop reversible frame aggregation, reversible header compression, or reversible data compression further comprises:

sending the first capability information from the first RBridge to the second RBridge in at least one IS-IS message that comprises at least one TRILL Hello or at least one P2P Hello.

6. The at least one non-transitory computer-readable medium of claim 4, wherein the act of automatically applying the at least one capability to at least one data frame further comprises:

including in TRILL header options in a header of the data frame information indicative of the at least one capability applied to the at last one data frame.

7. A first RBridge in a network comprising a plurality of RBridges, the first RBridge comprising;

at least one computer-readable hardware memory; and
at least one hardware processor, coupled to the at least one computer-readable memory configured to:

send, to a second RBridge in the plurality of RBridges, first capability information indicative of whether the first RBridge supports any of hop-by-hop reversible frame aggregation, reversible header compression, or reversible data compression;

receive second capability information from the second RBridge, the second capability information being indicative of whether the second RBridge supports any of hop-by-hop reversible frame aggregation, reversible header compression, or reversible data compression;

determine, based at least in part on the received second capability information, whether any of hop-by-hop reversible frame aggregation, reversible header compression, or reversible data compression are supported by both the first RBridge and the second RBridge;

when it is determined that at least one capability in the group of capabilities comprising hop-by-hop reversible frame aggregation, reversible header compression, or reversible data compression is supported by both the first RBridge and the second RBridge, automatically apply the at least one capability to at least one data frame transmitted from the first RBridge to the second RBridge, wherein the first RBridge is not an ingress RBridge for the at least one data frame or wherein the second RBridge is not an egress RBridge for the at least one data frame, wherein the at least one capability comprises at least two capabilities, wherein the at least two capabilities include hop-by-hop reversible frame aggregation and reversible data compression, and wherein the at least one hardware processor is configured to apply hop-by-hop reversible frame aggregation to that at least one data frame before applying reversible data compression to the at least one data frame.

8. The first RBridge of claim 7, where the at least one hardware processor is configured to send the first capability information to the second RBridge in at least one IS-IS message that comprises at least one TRILL Hello or at least one P2P Hello.

9. The first RBridge of claim 7, wherein the at least one hardware processor is configured to include in TRILL header options in a header of the data frame information indicative of the at least one capability applied to the at last one data frame.

* * * * *